US009221467B2

(12) United States Patent
Baum et al.

(10) Patent No.: US 9,221,467 B2
(45) Date of Patent: Dec. 29, 2015

(54) DETERMINING THE INSTALLATION LOCATION OF A WHEEL SENSOR

(71) Applicant: Dr. Ing. h.c. F. Porsche Aktiengesellschaft, Stuttgart (DE)

(72) Inventors: Michael Baum, Tiefenbronn-Lehningen (DE); Leonardo Pascali, Moensheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/314,731

(22) Filed: Jun. 25, 2014

(65) Prior Publication Data

US 2015/0032351 A1    Jan. 29, 2015

(30) Foreign Application Priority Data

Jul. 23, 2013   (DE) .......................... 10 2013 107 828

(51) Int. Cl.
  *G06F 7/70*   (2006.01)
  *B60W 40/109*   (2012.01)
  *B60C 23/00*   (2006.01)
  *B60C 23/04*   (2006.01)

(52) U.S. Cl.
  CPC .............. *B60W 40/109* (2013.01); *B60C 23/00* (2013.01); *B60C 23/0416* (2013.01); *B60C 23/0488* (2013.01)

(58) Field of Classification Search
  CPC   B60C 23/0416; B60C 23/0488; B60C 23/00; B60W 40/109; B62D 15/025
  USPC ............ 701/2, 31.4, 34.4, 41, 42, 70, 72, 45, 701/36, 46; 340/435, 438, 442, 477; 180/412
  See application file for complete search history.

(56) References Cited

U.S. PATENT DOCUMENTS

| | | | |
|---|---|---|---|
| 5,416,703 A * | 5/1995 | Gruler et al. ...................... 701/1 |
| 7,860,634 B2 | 12/2010 | To et al. |
| 2013/0207796 A1 | 8/2013 | Stewart et al. |
| 2014/0330480 A1 * | 11/2014 | Kopper et al. ............... 701/33.1 |

FOREIGN PATENT DOCUMENTS

| | | | |
|---|---|---|---|
| DE | 102004037326 | * | 1/2006 |
| DE | 102004037326 A1 | | 1/2006 |
| DE | 102005057305 A1 | | 6/2007 |
| WO | WO 2012/035121 A1 | | 3/2012 |

OTHER PUBLICATIONS

German Search Report, dated Aug. 30, 2013, corresponding to counterpart German Patent Application No. 10 2013 107 828.1, with partial English translation.

* cited by examiner

*Primary Examiner* — Gertrude Arthur Jeanglaude
(74) *Attorney, Agent, or Firm* — RatnerPrestia

(57) ABSTRACT

A method for determining an installation location of a wheel sensor on a wheel of a motor vehicle, wherein the method includes the steps of sampling a transverse acceleration signal of the wheel sensor, comparing the received transverse acceleration signal with a transverse acceleration signal of the motor vehicle, and determining that the wheel sensor is located on a steerable axle of the motor vehicle if the transverse acceleration signals differ from one another.

9 Claims, 3 Drawing Sheets

US 9,221,467 B2

DETERMINING THE INSTALLATION LOCATION OF A WHEEL SENSOR

CROSS-REFERENCE TO RELATED APPLICATION

This application claims priority to German Patent Application No. 10 2013 107 828.1, filed Jul. 23, 2013, which is incorporated by reference herein in its entirety.

FIELD OF THE INVENTION

The invention relates to a wheel sensor for use on a motor vehicle. In particular, the invention relates to determining on which of the wheels of a motor vehicle a predetermined wheel sensor is mounted.

BACKGROUND OF THE INVENTION

A motor vehicle comprises a plurality of wheels on which wheel sensors are mounted. Each wheel sensor can sample, for example, an air pressure of a tire which is mounted on the wheel. The sampled information is usually transmitted from the wheel to the motor vehicle by means of a wireless transmission link. Since the wheel sensors can be exchanged or interchanged, for example, during servicing work on the wheels or tires, it is necessary occasionally to carry out reassignment between a wheel sensor and an installation location. The term installation location is meant here to refer to the designation of a wheel of the motor vehicle, for example "front left" or "rear right".

WO 2012/035121 A1, which is incorporated by reference herein, presents a tire monitoring system in which each tire is assigned a transverse acceleration sensor.

U.S. Pat. No. 7,860,634 B2, which is incorporated by reference herein, presents a method for determining the location of tires in which each tire is assigned an acceleration sensor. In this context, directional information of a transverse acceleration signal of the acceleration sensor is evaluated in order to determine whether the wheel is on the right or on the left.

DE 10 2005 057 305 A1, which is incorporated by reference herein, presents a device for a tire pressure monitoring system in which each wheel is assigned a sensor device for sensing steering movements of the assigned wheel. The sensor device determines here a transverse acceleration of the wheel assigned thereto. From a comparison of the sensor signals with one another it is possible to determine whether a wheel is on the front axle or on the rear axle.

In addition it is known to position a receiver for the wireless transmission of the information of the wheel sensors in such a way that the transmission path to one of the axles is shorter than to the other axle. On the basis of the level of a reception signal it is then possible to infer the axle on which a transmitting wheel sensor is mounted. However, unexpected reflections of the wireless signals can bring about an incorrect assignment.

In yet a further embodiment, pulses from rotational speed sensors of all the wheels are counted during the transmission time of a wheel sensor. The position of the transmitting wheel sensor is determined on the basis of the counting result. This method is problematic, inter alia, because a relatively large number of signals have to be transmitted by a bus system of the motor vehicle, which can lead to transit time problems.

SUMMARY OF THE INVENTION

A method according to aspects of the invention for determining an installation location of a wheel sensor on a wheel of a motor vehicle comprises steps of sampling a transverse acceleration signal of the wheel sensor, of comparing the received transverse acceleration signal with a transverse acceleration signal of the motor vehicle, and of determining that the wheel sensor is located on a steerable axle of the motor vehicle if the transverse acceleration signals differ from one another.

If a wheel on the steerable axle is turned, a transverse acceleration acting on the wheel comprises a first component which acts in the direction of travel and a second component which acts transversely with respect thereto. The transverse acceleration of the steered wheel is therefore smaller during the cornering than the transverse acceleration of the motor vehicle. A simple and reliable assignment of a wheel sensor or a transverse acceleration signal received by the wheel sensor to an axle of the motor vehicle can be carried out on the basis of this knowledge.

In a preferred embodiment, it is also determined that the wheel sensor is located on a nonsteerable axle of the motor vehicle if the transverse acceleration signals correspond to one another. As a result, wheel sensors on the motor vehicle can be unambiguously assigned to a steerable or nonsteerable axle.

Specifically, the motor vehicle can comprise a steerable front axle and a nonsteerable rear axle. In this case, it is possible to determine that the wheel sensor is located on the front axle if the transverse acceleration signals differ from one another, and on the rear axle if the transverse acceleration signals correspond to one another. Wheel sensors of a customary motor vehicle can therefore be examined easily and reliably with respect to their installation location on the motor vehicle.

In one preferred embodiment it is determined that the transverse acceleration signals correspond to one another if they differ from one another by less than a predetermined amount. The predetermined amount can be specified as an absolute value or as a relative value, for example as a percentage value. Incorrect assignment of a wheel sensor to an axle can therefore be avoided.

The transverse acceleration signal of the motor vehicle is preferably made available by a vehicle movement dynamics control system. The vehicle movement dynamics control system can comprise, for example, an electronic stability program, an anti-lock brake system, a traction control system, an electronic braking force distribution system, a brake assistance system or an electronic brake system. As a result, a reliable and precise value for the transverse acceleration of the motor vehicle can easily be used.

It is preferably determined that the motor vehicle is traveling through a bend. As a result it is possible to ensure that a transverse acceleration is acting on the motor vehicle, which transverse acceleration permits the transverse acceleration signals to be differentiated. In one variant, it is also possible to specify a specific degree of cornering which has to be exceeded before the determination specified above is carried out. The degree can relate, for example, to a bend radius, a transverse acceleration of the motor vehicle or a difference in rotational speed between wheels on the same axle.

In a further preferred embodiment, in addition a rotational direction of the wheel assigned to the wheel sensor is determined on the basis of a longitudinal acceleration signal of said wheel sensor, and a right-hand or left-hand installation side on the motor vehicle is determined on the basis of the rotational direction. The installation position of the wheel sensor can therefore be easily narrowed down to one of, for example, four wheels of the motor vehicle.

A wheel sensor according to aspects of the invention for carrying out the described method is configured for mounting on a wheel of a motor vehicle and comprises a transverse acceleration sensor for determining an acceleration which runs perpendicularly with respect to a rotational plane of the wheel. The acceleration forces acting in the transverse direction of the wheel can therefore be made available for the described method.

In one particularly preferred embodiment, the wheel sensor comprises a pressure sensor for sensing an air pressure of a tire mounted on the wheel. A sensed tire air pressure can therefore easily be transmitted, in particular in a wireless fashion, to a processing device of the motor vehicle which can carry out an assignment of the sampled tire air pressure on the basis of the transverse acceleration signal of the wheel sensor. It is therefore easily possible to relate an adaptation of the tire air pressure or the outputting of a warning, if the tire air pressure is too high or too low, to the correct tire or to the correct wheel.

A computer program product according to aspects of the invention comprises program code means for carrying out the method described above when the computer program product runs on a processing device or is stored on a computer-readable data carrier.

BRIEF DESCRIPTION OF THE DRAWINGS

The invention will now be described in more detail with respect to the appended figures, of which.

DETAILED DESCRIPTION OF THE INVENTION

Figure 1:
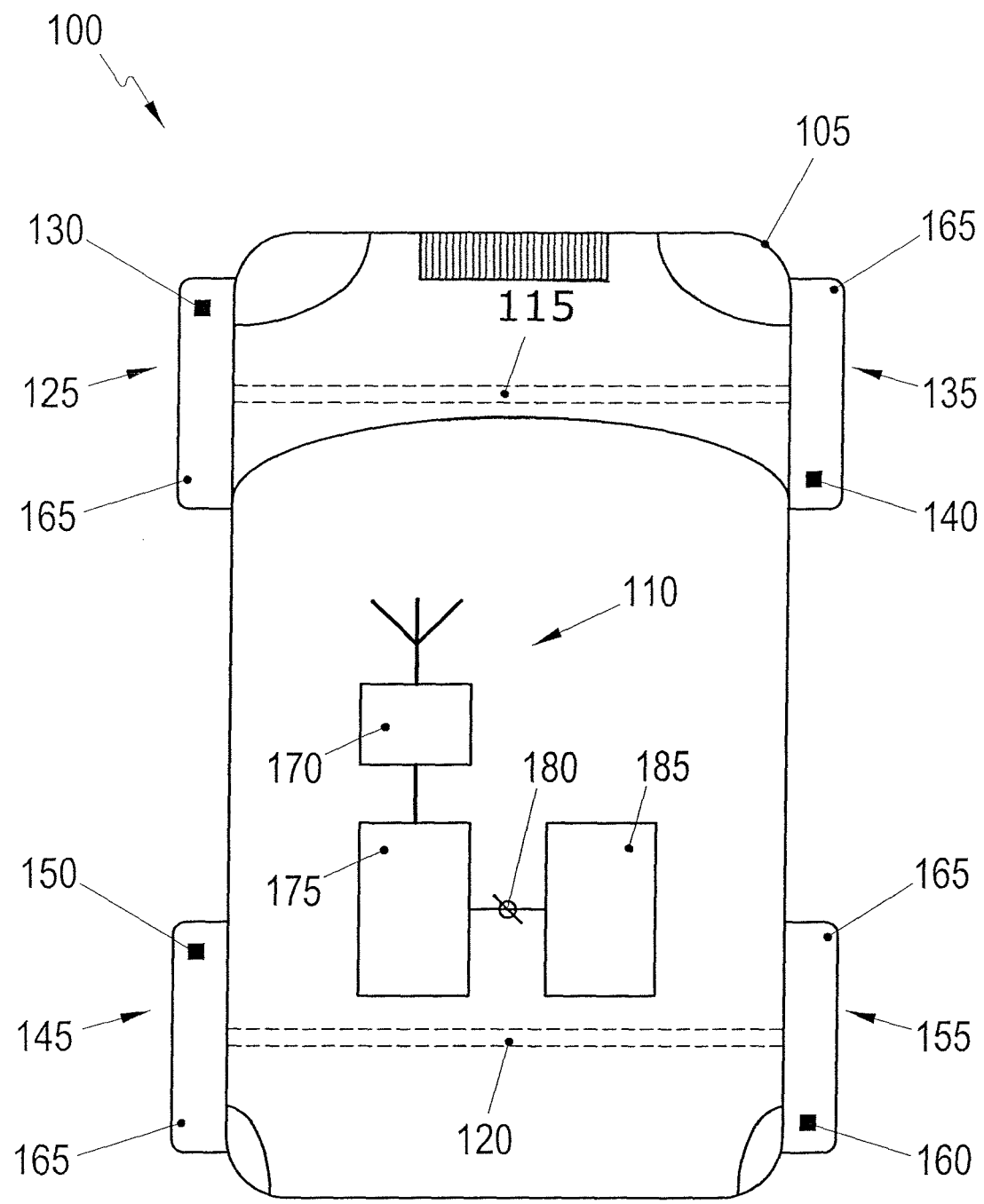
FIG. 1 illustrates a motor vehicle with tire sensors.

FIG. 1 shows a system 100 which comprises a motor vehicle 105 and a measuring device 110. The motor vehicle 105 comprises a front axle 115 which is steerable, and a rear axle 120 which is nonsteerable. A left-hand front wheel 125 with a first wheel sensor 130 and a right-hand front wheel 135 with a second wheel sensor 140 are mounted on the front axle 115. A left-hand rear wheel 145 with a third wheel sensor 150 and a right-hand rear wheel 155 with a fourth wheel sensor 160 are mounted on the rear axle 120. The wheel sensors 130, 140, 150 and 160 are usually mounted on a rim or a valve on the respective wheel 125, 135, 145, 155. In this context, the wheel sensors 130, 140, 150 and 160 are preferably configured to determine an air pressure of a tire 165 which is mounted on the respective wheel 125, 135, 145 or 155.

Information of the wheel sensors 130, 140, 150 and 160 are preferably transmitted in a wireless fashion to a receiver 170. The receiver 170 is connected to a processing device 175 which is preferably connected to a vehicle movement dynamics control system 185 via an interface 180, for example via a CAN bus. The processing device 175 and the vehicle movement dynamics control system 185 can also be embodied integrated with one another. The vehicle movement dynamics control system 185 makes available a transverse acceleration signal which indicates an acceleration of the motor vehicle 105 transverse with respect to its direction of travel. The wheel sensors 130, 140, 150 and 160 are configured to determine a transverse acceleration which runs perpendicularly with respect to a plane of rotation of the respectively assigned wheel 125, 135, 145 and 155. The processing device 175 is also configured to assign a wheel sensor 130, 140, 150, 160 to a wheel 125, 135, 145, 155 on the basis of a comparison of the different transverse accelerations determined. If a tire air pressure is transmitted together with the respective transverse acceleration to the receiver 170, it is possible in this way to assign the tire air pressure to the correct wheel 125, 135, 145 or 155 or to the tire 165 mounted thereon.

Figure 2:
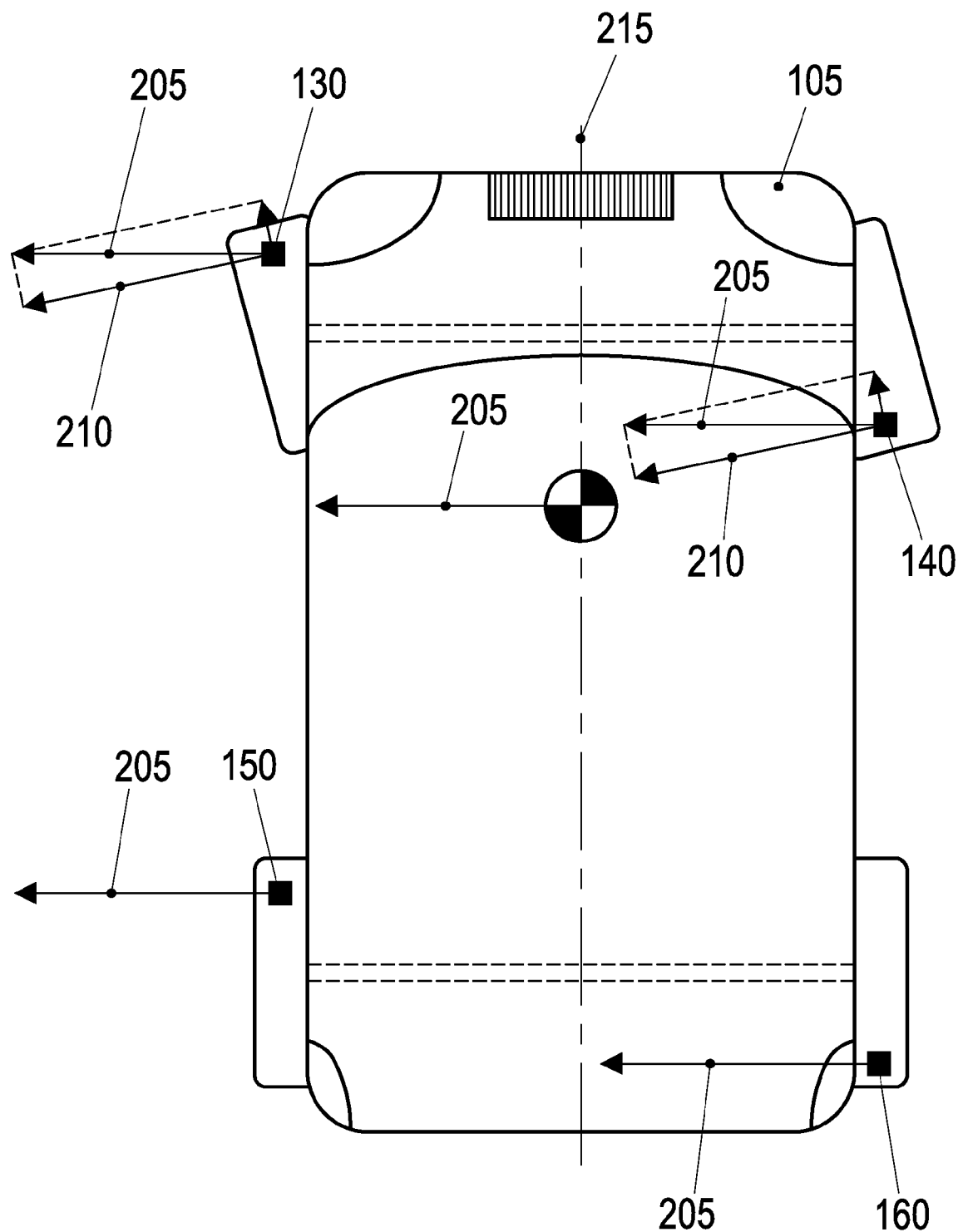
FIG. 2 illustrates transverse accelerations on the motor vehicle in FIG. 1.

FIG. 2 shows transverse accelerations on the motor vehicle 105 in FIG. 1 during travel through a bend. In this context, a bend to the left is assumed by way of example. Due to centrifugal forces and centripetal forces counteracting the latter, a first transverse acceleration 205 acts on the motor vehicle 105, it being possible to determine said transverse acceleration 205 in particular by means of the vehicle movement dynamics control system 185. The wheel sensors 150 and 160 are mounted on wheels 145 and 155 whose rotational planes run parallel to a longitudinal axis 215 of the motor vehicle. Accordingly, the first transverse acceleration 205 also acts on the wheel sensors 150 and 160 in the transverse direction.

However, the wheel sensors 130 and 140 are mounted on wheels whose rotational planes during cornering enclose a predetermined steering angle different from zero with the longitudinal axis 215. The second transverse acceleration 210 acting in the transverse direction of the wheel sensors 130 and 140 therefore reflects only part of the first transverse acceleration 205. According to the triangular inequation the second transverse acceleration 210 is smaller than the first transverse acceleration 205. The wheel sensors 130, 140, on which the smaller second transverse acceleration 210 acts in the transverse direction, can therefore be assigned to the steerable front axle 115, while the wheel sensors 150, 160, on which the larger first transverse acceleration 205 acts in the transverse direction, can be assigned to the nonsteerable axle 120.

Figure 3:
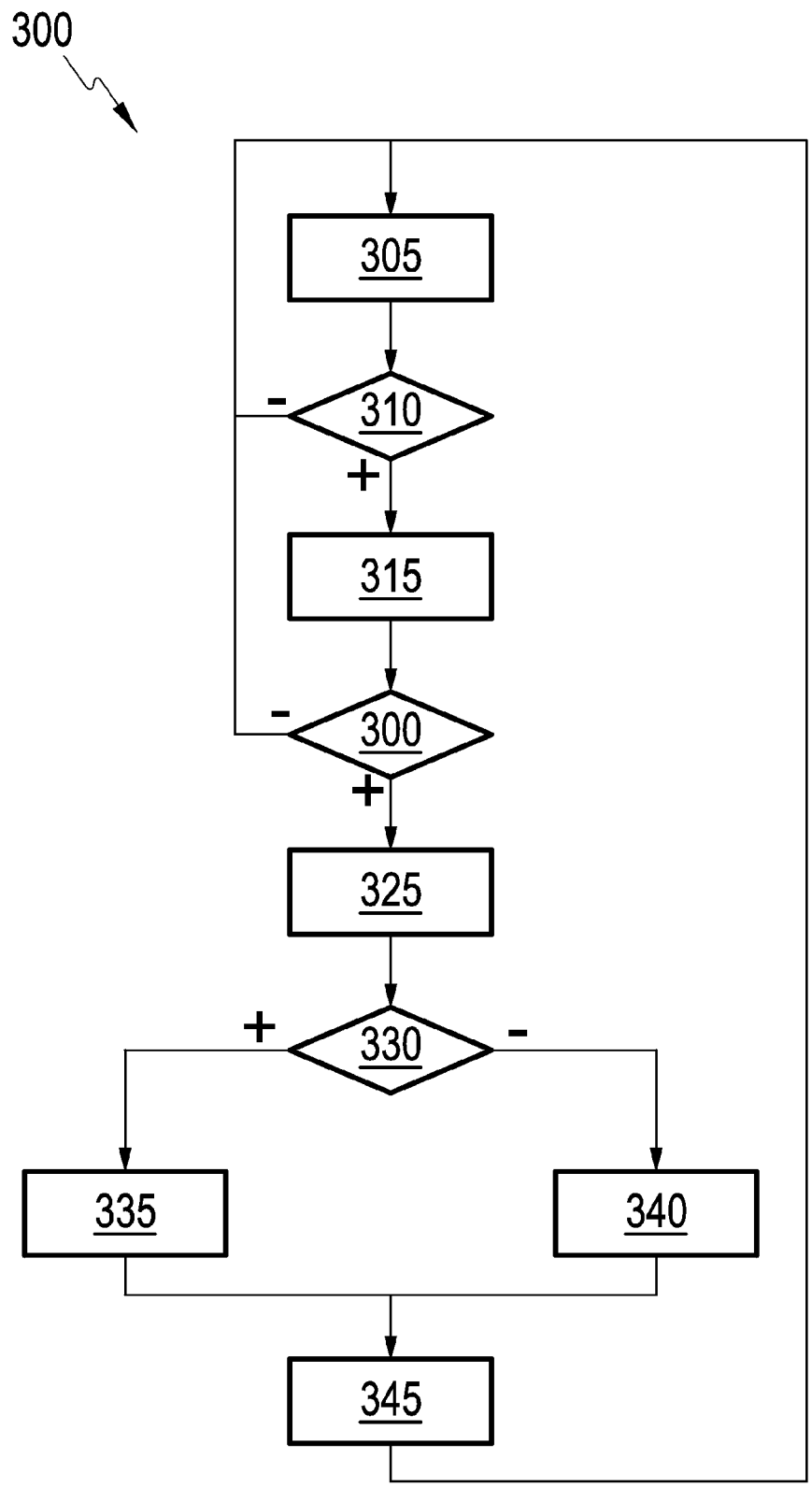
FIG. 3 illustrates a flow chart of a method for determining installation locations of wheel sensors on the motor vehicle in FIG. 1.

FIG. 3 shows a flowchart of a method 300 for determining installation locations of wheel sensors 130, 140, 150 and 160 on the motor vehicle 105 in FIG. 1. The method 300 is configured, in particular, to be run on the processing device 175.

In a first step 305, transverse accelerations are received by one or more sensors 130, 140, 150 and 160. In an optional step 310 it is possible to determine whether the motor vehicle 105 is moving and, if appropriate, whether this movement, for example in the form of a speed, is greater than a predetermined threshold value. If the motor vehicle 105 is not moving sufficiently, the method 300 branches back to the step 305 and can run through again.

Otherwise, in a step 315 the first transverse acceleration 205 is received by means of the interface 180, specifically preferably by the vehicle movement dynamics control system 185. Before or after this it is also possible in a step 320 to determine whether the motor vehicle 105 is traveling through a bend. It is possible to infer travel through a bend, for example, if a steering angle of the front wheels 125 and 135 which are mounted on the steerable axle 115 is greater than a predetermined threshold value. Alternatively, it is possible to infer travel through a bend if the first transverse acceleration 205 exceeds a predetermined threshold value. In yet a further embodiment, travel through a bend can also be determined if the transverse acceleration values which are received by the wheel sensors 130, 140, 150 or 160 individually or collectively exceed a predetermined threshold value. By adapting the respective threshold value it is possible to predefine how severe the cornering movement of the motor vehicle 105 has to be in order to infer a bend. If a bend is not present, the method 300 branches back to the step 305 and can run through again.

Otherwise, a difference between the respectively determined transverse acceleration 205 or 210 and the first transverse acceleration 205 is formed in a step 325 for each of the wheel sensors 130, 140, 150 and 160 from which information was received. In a step 330 it is then determined for each of the wheel sensors 130, 140, 150 and 160 whether the transverse acceleration 205, 210 determined essentially corresponds to the second transverse acceleration 210 or undershoots it. In this context it is possible to provide a further threshold value by which the transverse acceleration 205, 210 which is determined by the wheel sensor 130, 140, 150 or 160 must differ from the second transverse acceleration 210 in order to be considered to differ significantly. If there is a difference which exceeds the threshold value, in a step 335 it is determined that the respective wheel sensor 130, 140, 150, 160 is located on one of the wheels 125, 135 of the steerable axle 115. Otherwise, in a step 340 it is determined that said respective wheel sensor is located on a wheel 145, 155 of the nonsteerable rear axle 120.

LIST OF REFERENCE NUMBERS

100 System
105 Motor vehicle
110 Measuring device
115 Front axle (steerable)
120 Rear axle (nonsteerable)
125 Left-hand front wheel
130 First wheel sensor
135 Right-hand front wheel
140 Second wheel sensor
145 Left-hand rear wheel
150 Third wheel sensor
155 Right-hand rear wheel
160 Fourth wheel sensor
165 Tire
170 Receiver
175 Processing device
180 Interface
185 Vehicle movement dynamics control system
205 First transverse acceleration
210 Second transverse acceleration
215 Longitudinal axis
300 Method
305 Reception of transverse accelerations from sensors
310 optional.: Motor vehicle moving? Faster than threshold value?
315 Reception of transverse acceleration from ESP
320 Determine bend (e.g. steering angle/ESP transverse acceleration>threshold value/received transverse accelerations)
325 Determine differences between received and ESP transverse accelerations
330 Difference>threshold value?
335 Steerable axle (front axle)
340 Nonsteerable axle (rear axle)
345 optional.: determine rotational direction→vehicle side

What is claimed:

1. A method for determining an installation location of a wheel sensor on a wheel of a motor vehicle, wherein the method comprises:
    sampling a transverse acceleration signal of the wheel sensor;
    comparing the transverse acceleration signal of the wheel sensor, which is received, with a transverse acceleration signal of the motor vehicle, and
    determining that the wheel sensor is located on a steerable axle of the motor vehicle if the transverse acceleration signal of the wheel sensor differs from the transverse acceleration signal of the motor vehicle, wherein the motor vehicle comprises a steerable front axle and a nonsteerable rear axle and it is determined that the wheel sensor is located on the front axle if the transverse acceleration signals differ from one another and on the rear axle if the transverse acceleration signals correspond to one another.

2. The method as claimed in claim 1, wherein it is determined that the wheel sensor is located on a nonsteerable axle of the motor vehicle if the transverse acceleration signals correspond to one another.

3. The method as claimed in claim 2, wherein it is determined that the transverse acceleration signals correspond to one another if they differ from one another by less than a predetermined amount.

4. The method as claimed in claim 1, wherein the transverse acceleration signal of the motor vehicle is made available by a vehicle movement dynamics control system.

5. The method as claimed in claim 1, wherein it is firstly determined that the motor vehicle is traveling through a bend.

6. The method as claimed in claim 1, wherein a rotational direction is determined on the basis of a longitudinal acceleration signal of the wheel sensor, and a right-hand or left-hand installation side is determined on the basis of the rotational direction.

7. A wheel sensor for carrying out the method as claimed in claim 1, wherein the wheel sensor is configured for mounting on a wheel of a motor vehicle and comprises a transverse acceleration sensor for determining an acceleration which runs perpendicularly with respect to a rotational plane of the wheel.

8. The wheel sensor as claimed in claim 1, wherein the wheel sensor comprises a pressure sensor for sensing an air pressure of a tire mounted on the wheel.

9. A computer program product having program code means for carrying out the method as claimed in claim 1, when the computer program product runs on a processing device or is stored on a computer-readable data carrier.

* * * * *